(12) United States Patent
Kitada et al.

(10) Patent No.: US 7,821,562 B2
(45) Date of Patent: Oct. 26, 2010

(54) PORTABLE TERMINAL EQUIPPED WITH CAMERA AND ADAPTED FOR SELF-IMAGING

(75) Inventors: Yasuyuki Kitada, Kawasaki (JP); Susumu Aoyama, Kawasaki (JP); Makoto Ishida, Kawasaki (JP); Yoshikazu Watanabe, Kawasaki (JP)

(73) Assignees: Aaron C. Walker; Fujitsu Limited

( * ) Notice: Subject to any disclaimer, the term of this patent is extended or adjusted under 35 U.S.C. 154(b) by 976 days.

(21) Appl. No.: 10/359,654

(22) Filed: Feb. 7, 2003

(65) Prior Publication Data
US 2004/0008266 A1 Jan. 15, 2004

(30) Foreign Application Priority Data
Jun. 12, 2002 (JP) ............... 2002-170784

(51) Int. Cl.
*H04N 5/222* (2006.01)
(52) U.S. Cl. .................. 348/333.02
(58) Field of Classification Search ............ 348/333.06, 348/333.01–333.04
See application file for complete search history.

(56) References Cited

U.S. PATENT DOCUMENTS

| | | | | |
|---|---|---|---|---|
| 5,559,554 | A | * | 9/1996 | Uekane et al. ......... 348/333.02 |
| 2001/0005454 | A1 | | 6/2001 | Nishino et al. |
| 2002/0057847 | A1 | | 5/2002 | Hayashi et al. |
| 2002/0142810 | A1 | * | 10/2002 | Kawasaki et al. .......... 455/566 |
| 2002/0171747 | A1 | * | 11/2002 | Niikawa et al. ........ 348/333.01 |
| 2002/0175990 | A1 | * | 11/2002 | Martino et al. ........... 348/14.08 |
| 2005/0225650 | A1 | | 10/2005 | Hayashi et al. |
| 2006/0125946 | A1 | * | 6/2006 | Nishino et al. ......... 348/333.06 |
| 2008/0303916 | A1 | | 12/2008 | Hayashi et al. |

FOREIGN PATENT DOCUMENTS

CN 1302152 A 7/2001

(Continued)

OTHER PUBLICATIONS

Product Pamphlet of SH251i (Portable Phone) presented by NTT DOCOMO LTD. (with English translation).

(Continued)

*Primary Examiner*—David L Ometz
*Assistant Examiner*—Dillon Durnford-Geszvain
(74) *Attorney, Agent, or Firm*—Staas & Halsey LLP (57) ABSTRACT

The present invention relates to a portable terminal provided with a camera to take a picture of a subject comprised of a lens, and an image pickup device. The invention is aimed to provide a portable terminal in which a mirror image or information about photographing status is displayed on a first display which can be seen from the object side when an object is photographed using the portable terminal, and the image is displayed on a second display which can be seen from the to-be-taken subject so that a person to be photographed can easily check his/her image or photographing status. To this end, the first display is provided on the surface on which the lens is provided and the second display is provided on a side different from the side on which the lens is provided. Provision is made of a display unit that displays the image, photographed by directing the lens to the subject, on the first and the second displays.

4 Claims, 7 Drawing Sheets

FOREIGN PATENT DOCUMENTS

| | | |
|---|---|---|
| CN | 1379609 A | 11/2002 |
| JP | 2001-186396 | 7/2001 |
| JP | 2001-257911 | 9/2001 |
| JP | 2001-320454 | 11/2001 |
| JP | 2002-94629 | 3/2002 |
| JP | 2002-152582 | 5/2002 |
| JP | 2003-198676 | 7/2003 |
| KR | 2001-0000974 | 1/2001 |
| KR | 2002-0055953 | 7/2002 |
| WO | WO 01/31893 | 5/2001 |
| WO | 01/53919 | 7/2001 |

OTHER PUBLICATIONS

Notification of the First Office Action relating to Chinese Patent Application No. 031068545 dated Jun. 10, 2005.

European Search Report issued Nov. 24, 2005 in European Application No. 03250832.7.

Korean Patent Office Action, mailed Feb. 27, 2008 and issued in corresponding Korean Patent Application No. 10-2003-0013332.

"NTT Docomo announces Handset with Camera, SH2511 and i-short service", K-tai Watch, Japan, http://k-tai.impress.co.jp/cda/article/news_toppage/9582.html, May 28, 2002.

Japanese Office Action mailed Oct. 10, 2006 and issued in corresponding Japanese Patent Application 2002-170784.

Japanese Office Action mailed Jan. 16, 2007 and issued in corresponding Japanese Patent Application 2002-170784.

Japanese Office Action mailed Mar. 3, 2009 and issued in corresponding Japanese Patent Application 2006-332700.

Japanese Office Action mailed May 12, 2009 and issue in corresponding Japanese Patent Application 2006-33270.

* cited by examiner

PORTABLE TERMINAL EQUIPPED WITH CAMERA AND ADAPTED FOR SELF-IMAGING

BACKGROUND OF THE INVENTION

1. Field of the Invention

The present invention relates to a portable terminal provided with a camera comprised of a lens to take a picture of a to-be-taken subject and an image pickup device. The portable terminal of the present invention digitally processes an image taken by a camera installed in, for example, a notebook PC, a PDA (Personal Digital Assistant), or a cellular phone and displays the same on a display device of the portable terminal.

2. Description of the Related Art

Conventionally, a cellular phone has been provided with a subminiature camera having an image pickup device such as CCD so that the taken image can be attached to an e-mail to be sent. In a foldable cellular phone, it is used in unfolded state to make the lens of a camera, provided on an outer surface of the cellular phone, point toward a partner, and an image is displayed on a display device provided on an inner surface of the cellular phone. The image is adjusted its size and position to be properly taken, and then a shutter key is depressed to take a photo of the partner. Further, the taken photo is sent by e-mail as an attachment.

When a person who has the cellular phone takes a self-portrait photo, the cellular phone is used in folded state to make a lens of the camera provided on an outer surface of the cellular phone direct to him/herself to display the image of his/her face on a small second display device which is provided on outer surface of the cellular phone and normally displays a date or the like. Further, the taken photo is sent by e-mail as an attachment.

As described above, conventionally, (1) when a person takes a picture of his/her partner, the lens on the outer surface of the cellular phone is directed to the partner so that the image of the partner is displayed on the display device on inner surface of the cellular phone so that the partner can be seen through the display device.

(2) when a person takes a self-portrait photo, the cellular phone is used as folded state, and the lens on the outer surface of the cellular phone is directed to him/herself so that the image of him/herself is displayed on the small second display device which normally displays a date or the like on outer surface of the cellular phone so that the person can see himself reflected in a mirror.

Therefore, if the photographer is taking photo of his/her partner, the photographer can check the facial expression of the partner shown on the display device on inner surface of the cellular phone. However, the partner cannot check how he/she is taken in photo with regard to the size or the expression, and the partner must check the image displayed after taking the photo.

SUMMARY OF THE INVENTION

The present invention is aimed to solve the problems that, when the photographer takes photo of his/her partner using the camera on the cellular phone, the image of the partner is displayed as a reversed image, or information about the photographing status is displayed on the first display which is seen from the partner, concurrent with the image being displayed on the second which can be seen by the photographer so that a partner can check a self-portrait to be taken or the photographing status.

Means to solve the problem will be explained with reference to FIG. 1.

Figure 1A:
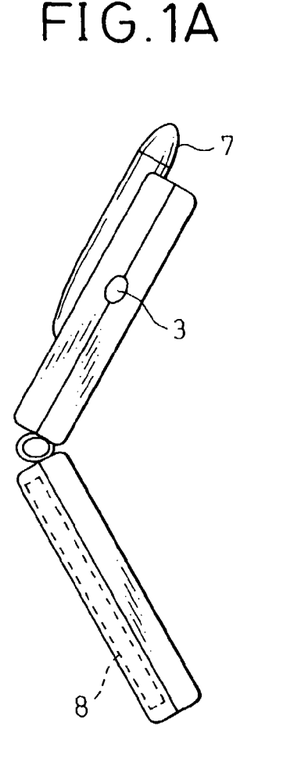
FIG. 1A is a side view of an almost unfolded cellular phone of the present invention.
Figure 1B:
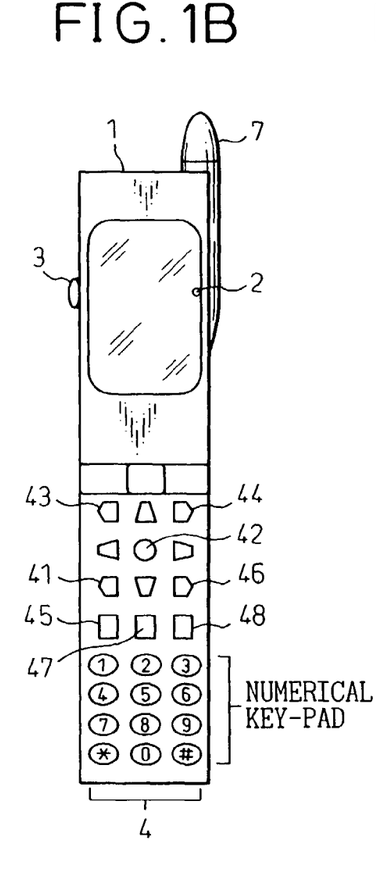
FIG. 1B is a front view of a completely unfolded cellular phone of FIG. 1A.
Figure 1C:
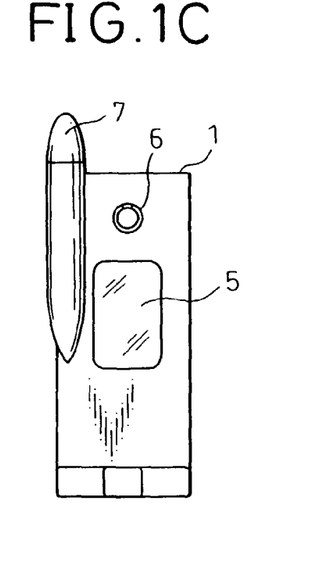
FIG. 1C is a front view of a folded cellular phone of FIG. 1A.

As shown in FIG. 1, a portable terminal 1 of the present invention comprises a main LCD 2, shutters 3, 42, a sub LCD 5, a camera 6 and the like.

The main LCD 2 corresponds to the inner display device of the portable terminal 1 and is a display (a second display) provided on the opposite side, i.e., the different side, on which the lens constituting the camera 6 exists.

The shutter key 42 or the shutter 3 are to operate a shutter of the camera 6 to take a photo.

The sub LCD 5 corresponds to the outer display of the portable terminal 1 and is a display (a first display) provided on the same side on which the lens constituting the camera 6 exists.

The camera 6 is comprised of the lens and the image pickup device and the like, and generates an image of a taken photo of a subject.

Next, a structure and an operation will be explained.

The portable terminal 1 is provided with the sub LCD 5 as the first display on the same side of the lens constituting the camera 6 and the main LCD 2 as the second display on the opposite side of the lens constituting the camera 6, so that a controller 8 makes an image taken by directing the lens to the subject of the photo displayed on the main LCD 2, and makes the image or the information about the photographing status displayed on the sub LCD 5.

Then, a through image, to see the subject, is displayed on the min LCD 2. When the image is displayed on the sub LCD 5, a reversed image like a mirror image of the subject is shown.

Also, when a shutter key 43 or the shutter 3 is depressed, a stationary image of the subject is displayed on the main LCD 2, and if an image is to be displayed on the sub LCD 5, the stationary image is displayed or if information of the photographing status is to be displayed, a photographing completion information is displayed.

If the image is displayed on the sub LCD 5, the image is scaled down, or is partitioned and one piece of the partitioned image is displayed.

The sub LCD 5 is provided with a switching unit that switches the image and the information about the photographing status.

Accordingly, when the partner is taken in photo with the portable terminal 1, the information about and the photographing status and the image reversed like a mirror image are displayed on the first display of the sub LCD 5 which can be seen from the partner, as they are also displayed on the second display of the main LCD 2, so that the partner can check the image to be taken in photo or the photographing status.

BRIEF DESCRIPTION OF THE DRAWINGS

FIG. 2A-1 shows an example of a display of a sub LCD which displays photographing status.

FIG. 2A-2 shows an example of a display of a sub LCD displaying information about photographing status (during shooting).

FIG. 2A-3 shows an example of a display of a sub LCD displaying information about photographing status (during displaying).

FIG. 2B-1 shows an example of a main LCD displaying photographing status.

FIG. 2B-2 shows an example of a display of a sub LCD displaying information about photographing status (during storing).

DESCRIPTION OF THE PREFERRED EMBODIMENTS

A mode and an operation will be successively explained in detail below with reference to drawings.

FIG. 1A to C are external views of a cellular phone.

FIG. 1A is a side view of an almost unfolded cellular phone, FIG. 1B is front view of the completely unfolded cellular phone, FIG. 1C is a front view of the folded cellular phone.

The portable terminal 1 is provided with the main LCD 2 or the like having the second display on the upper portion of the portable terminal 1 as shown in the inside of the unfolded portable terminal, an input device 4, the controller 8 and the like on the lower portion of the portable terminal 1.

If the portable terminal 1 is a cellular phone, the main LCD 2 has a display shown as numeral 2, to display a phone number, a transmitting screen.

The controller 8 performs various controls (image display, transmission control or the like) by a program and a hardware circuit, and is explained below with reference to FIG. 7.

The shutter 3 is provided on a side of the portable terminal 1, which is folded into two to shoot by operating the camera 6.

The input device 4 performs various operation instructions, phone number input, e-mail text input by depressing keys, and comprised of a camera key 41, the shutter key 42, a menu key 43, telephone book key 44, a start key 45, a calendar key 46, a clear key 47, a power key 48, a numerical key-pad and the like.

The camera key is depressed to start up a camera mode.

The shutter key 42 generates an image taken in a photo by depressing the same.

The clear key 47 is used to clear various input. In this drawing, the clear key 47 is depressed to clear the taken photo.

The antenna 7 sends and receives a radio wave. In this drawing, the antenna 7 is used to indicate to the photographic object by lighting up a built-in indicator during shooting by depressing the shutter key 42 or the shutter 3.

FIGS. 2A-1, 2A-2, and 2A-3 shows the display side of the sub LCD 5.

Figure 2A:
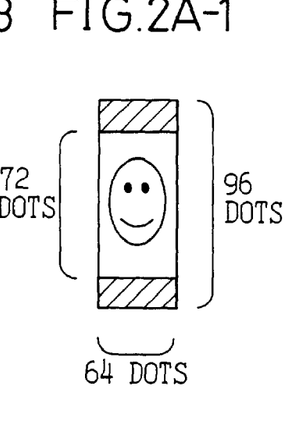
Figure 2A:
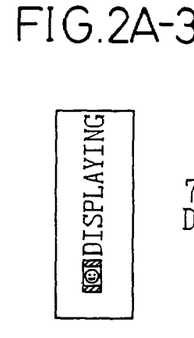
Figure 2A:
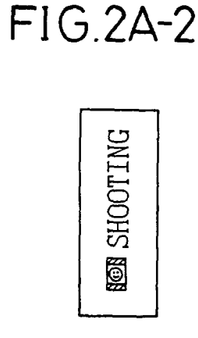
Figure 2B:
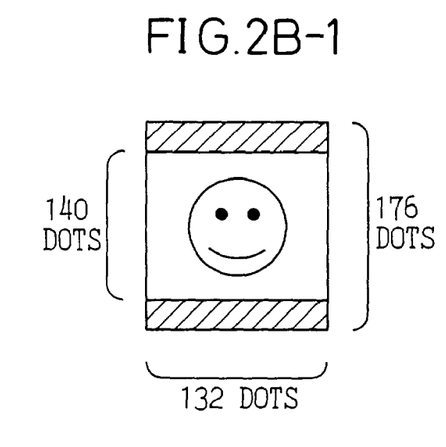
Figure 2B:
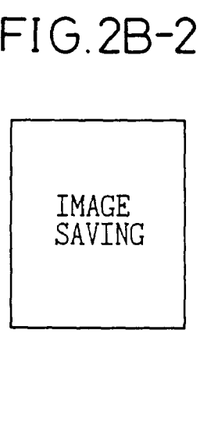

FIG. 2A-1 shows the number of the dots of the screen of the sub LCD 5. In this drawing, the sub LCD 5 is derived from 96 dots in the entire vertical direction, 72 dots in a vertical direction to display the image, and 64 dots in the entire horizontal direction.

FIG. 2A-2 shows the sub LCD 5 showing a message "Shooting" on it. The message "Shooting" represents that the camera 6 is taking photo of the to-be-taken subject and the image to be taken is displayed on the main LCD 2.

FIG. 2A-3 shows the sub LCD 5 showing a message "Displaying" on it. The message "Displaying" represents that the still photo of the to-be-taken subject taken by camera 6 is displayed on the main LCD 2.

FIGS. 2B-1, 2B-2 show a screen example of the main LCD 2. FIG. 2B-1 shows the number of the dots of the screen of the main LCD 2. In this drawing, the main LCD 2 is derived from 176 dots in the entire vertical direction, 140 dots in a vertical direction to display the image, and 132 dots in the entire horizontal direction.

FIG. 2B-2 shows the main LCD 2 showing a message "Saving image" on it. The message "Saving image" represents that the still photo of the to-be-taken subject taken by camera 6 is being saved (stored) as a file (See FIGS. 4 and 5).

Figure 3:
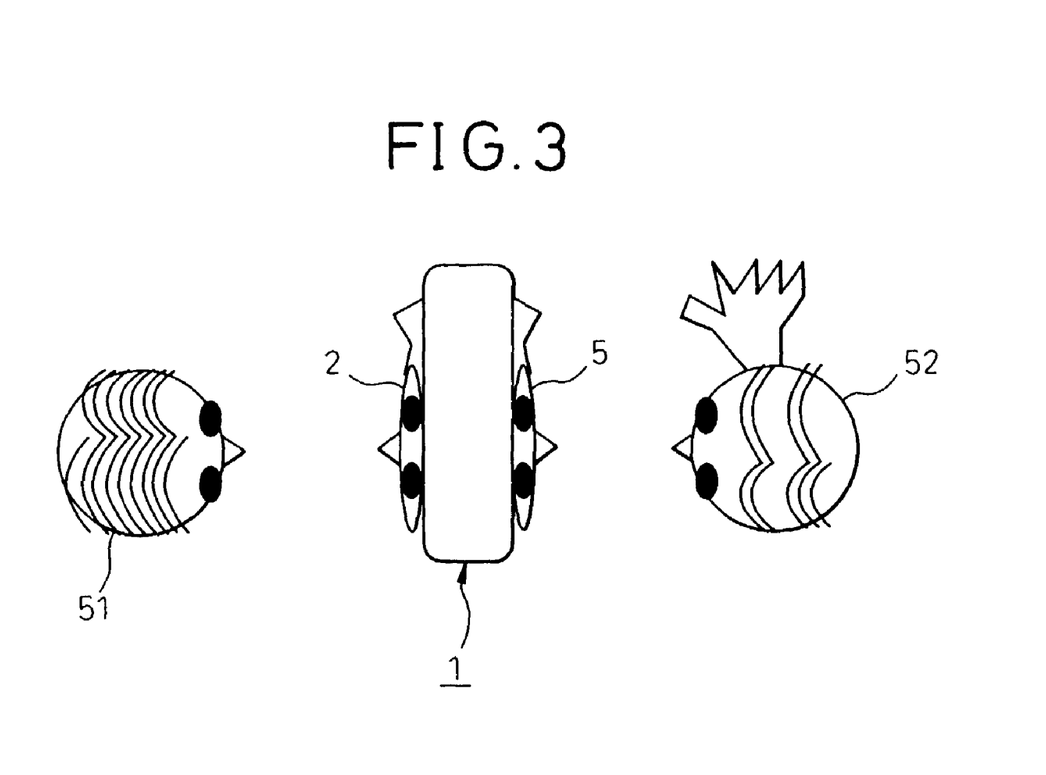
FIG. 3 is a top view of a cellular phone of FIG. 1B.

FIG. 3 is a top view of a cellular phone of Fi. B.

In FIG. 3, the left person is a photographer 51 who has the portable terminal 1 in his/her hand so that the lens of the camera 6 is made directed to the to-be-taken subject 52 to take a photo. A through image of the to-be-taken subject 52 (the same image as that the photographer 51 sees the to-be-taken subject 52 directly) is displayed on the main LCD 2.

The right person, the to-be-taken subject 52, is pointed by the lens of the camera 6 of the portable terminal 1 to be taken in photo. A reversed image (reversed left to right like a mirror image) of the to-be-taken subject 52 is displayed on the sub LCD 5.

The central portable terminal 1 has structures mentioned in FIGS. 1A to 1C, FIGS. 2A-1 to 2A-3, FIG. 2B-1, and FIG. 2B-2.

As described above, when the photographer 51 holds the portable terminal to make the lens of the camera 6 point to the to-be-taken subject 52 and depresses the camera key 41 to switch into the camera mode, the through image is displayed on the main LCD 2 which can be seen from the photographer 51 while the reversed image is displayed on the sub LCD 5 which can be seen from the to-be-taken subject 52, therefore, the to-be-taken subject 52 can recognize feeling and size of the image to be taken in photo simultaneously, and the image to be taken or taken photo can be shared with the photographer 51 and the to-be-taken subject 52.

Figure 4:
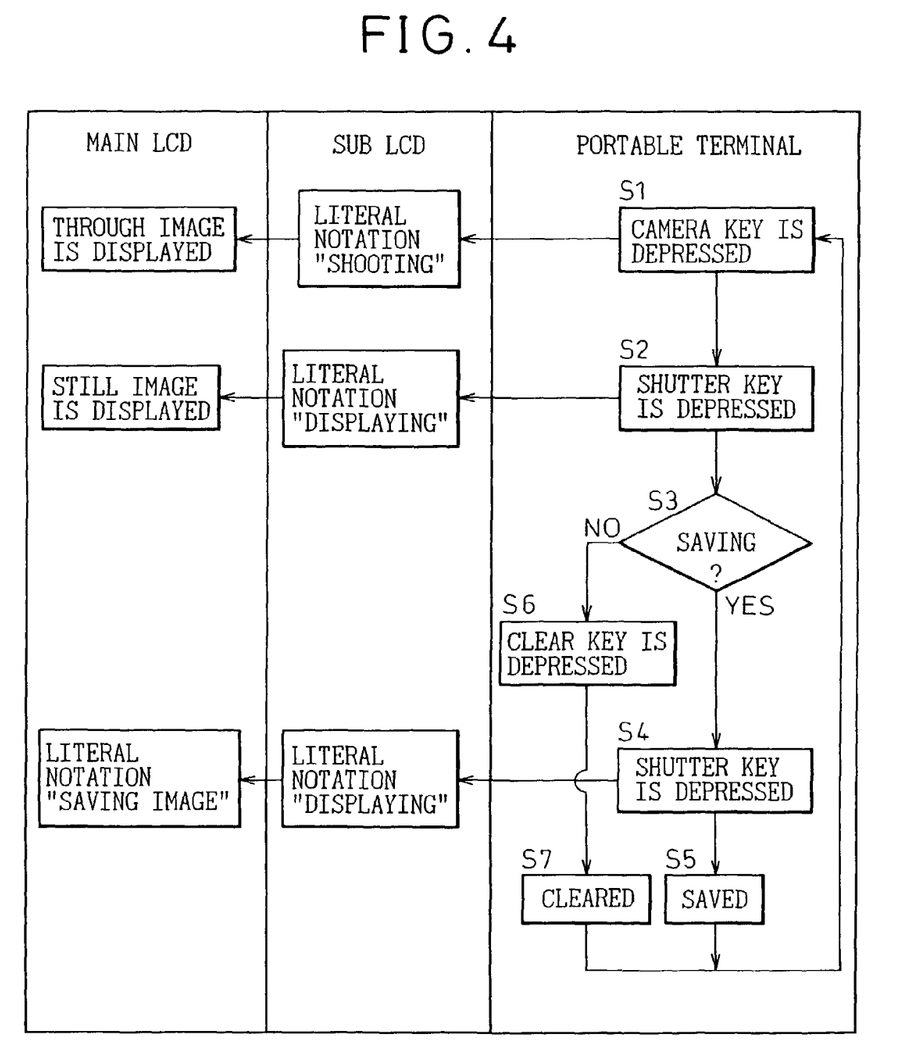
FIG. 4 is a flowchart to explain an operation of a cellular phone of the present invention.

FIG. 4 is a flow chart to explain an operation of the present invention. In this drawing, the main LCD 2 and the sub LCD 5 is the same as that explained in FIG. 1 with the same number. When the photographer 51 depresses a key provided on the portable terminal 1, the portable terminal 1 detects the depression and carries out the process described below.

In FIG. 4, a camera key 41 is depressed in a step S1, that is, the photographer 51 depresses the camera key 41 of the portable terminal 1. According to this depression, a literal notation "Shooting" is displayed on the sub LCD 5 and the through image is displayed on the main LCD 2.

As described above, when the photographer 51 has the portable terminal to make the lens of the camera 6 direct to the to-be-taken subject 52 and depresses the camera key 41, the through image of the to-be-taken subject 52 is displayed on the main LCD 2 which can be seen from the photographer 51 while the literal notation of shooting is displayed on the sub LCD 5 which can be seen from the to-be-taken subject 52, therefore, the to-be-taken subject 52 can recognize that him/herself is been taken in photo.

In a step S2, the photographer depresses (operates) the shutter key 42 provided on the portable terminal 1 or a shutter 3 provided on the side of the portable terminal 1. According to this depression, the massage "Displaying" is displayed on the sub LCD 5 while the still photo is displayed on the main LCD 2.

As described above, when the photographer 51 depresses the shutter key 42 or the shutter 3 directing the lens consisting of the camera 6 to the to-be-taken subject 52, the still image of the to-be-taken subject 52 is displayed on the main LCD 2 which can be seen from the photographer 51 the literal notation that the taken still photo is displayed on the sub LCD 5 which can be seen from the to-be-taken subject 52, thus the to-be-taken subject 52 can recognize that the still image of him/herself is displayed.

In a step S3, the photographer 51 sees the taken still photo displayed on the main LCD 2 and determines whether or not the taken photo is to be saved. If Yes, the flow goes to a step S4. If No, that is, the photographer has decided not to save the photo, the flow goes on to a step S6.

In a step S4, as the photographer decided to save the photo, the shutter key 42 or the shutter 3 is depressed to instruct saving. In response to the instruction, the literal notation "Displaying" is displayed on the sub LCD 5 and the literal notation "Saving Picture" is displayed on the main LCD 2.

In a step S5, the picture is saved in the memory.

According to the above Yes in S3, S4 and S5, when the photographer 51 sees the still picture displayed on the main LCD 2 and decides to save the picture, the shutter key 42 or the shutter 3 is depressed, the "Displaying" is displayed on the sub LCD 5 and the "Saving Picture" is displayed on the main LCD 2, and the still picture is saved in an internal memory or the like.

In a step S6, because the photographer decided not to save the photographed still picture, the clear key 47 is depressed to instruct clearing.

In a step S7, in response to the instruction of clearing in the step S6, the still picture in a working memory is cleared.

According to the above No in S3, S6 to S7, when the photographer 51 sees the still picture displayed on the main LCD 2 and decides not to save the picture, the clear key 47 is depressed to clear the still picture.

Figure 5:
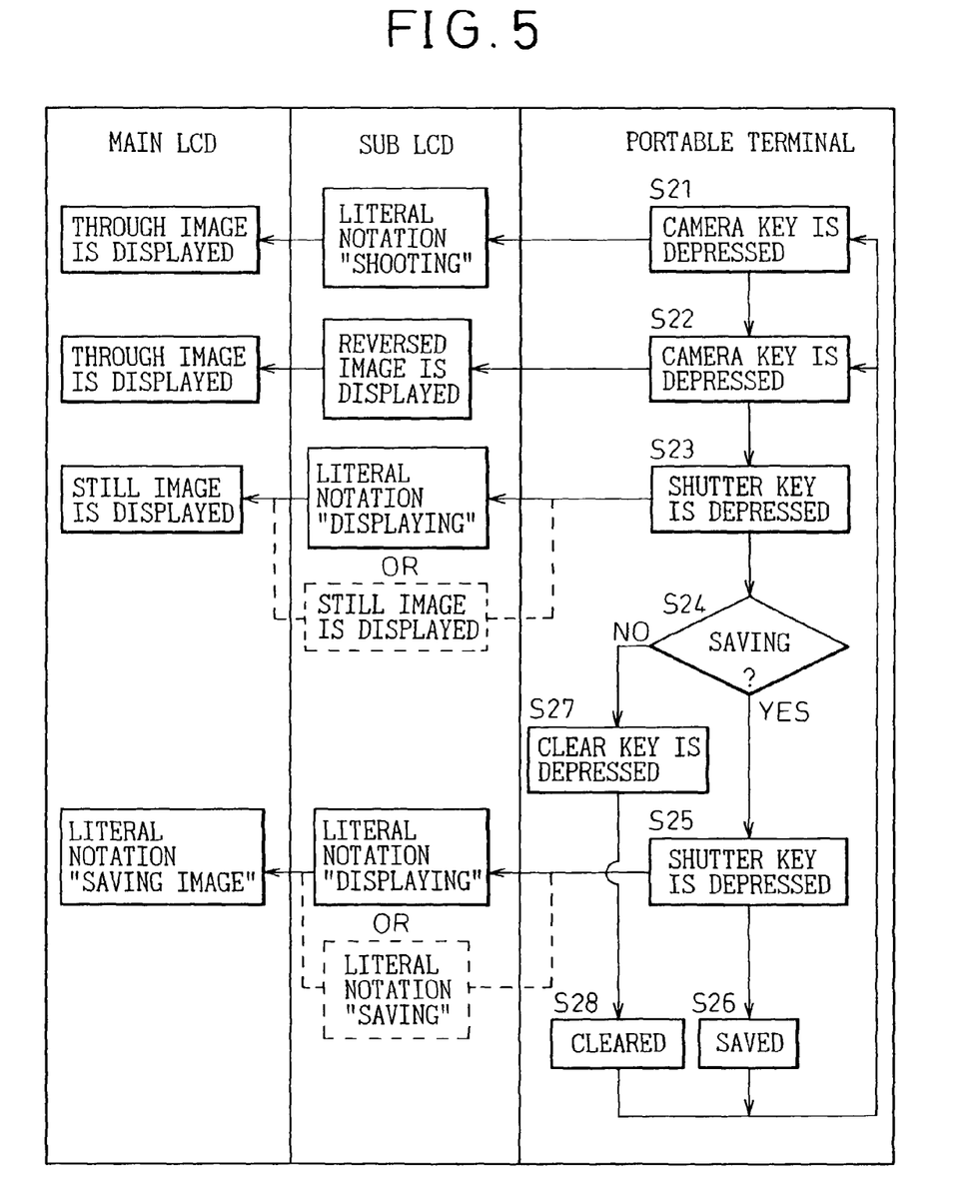
FIG. 5 is a flowchart to explain another operation of a cellular phone of the present invention.

FIG. 5 is a flow chart to explain another operation of the cellular phone. In this drawing, an image of the to-be-taken subject 52 is reversed in the right and left directions like an mirror image on the sub LCD 5 and, to the contrary, the literal notation is displayed on the sub LCD 5 in the flow chart of FIG. 4.

In FIG. 5, a camera key 41 is depressed in a step S21, that is, the photographer 51 depresses the camera key 41 of the portable terminal. In response to the depression, the literal notation "Shooting" is displayed on the sub LCD 5 while the through image is displayed on the main LCD 2.

According to the above step S21 or the like, the photographer 51 has the portable terminal to make the lens of the camera 6 direct to the to-be-taken subject 52 and depresses the camera key 41, the through image is displayed on the main LCD 2, which can be seen from the photographer 51, while the image reversed in right and left directions is displayed on the sub LCD 5, which can be seen from the to-be-taken subject 52. Therefore, the photographer 51 can see the photographed picture of the to-be-taken subject 52 on the main LCD 2 simultaneously with the to-be-taken subject 52 seeing the image reversed in right and left directions, like a mirror image, displayed on the sub LCD 5.

In a step S22, a camera key 41 is depressed. In response to the depression, the image reversed in the right and left directions is displayed on the sub LCD 5 while the through image is displayed on the main LCD 2.

According to the above step S22 etc., the camera key 41 is depressed while directing the lens of the camera 6 to the to-be-taken subject 52, the through image is displayed on the main LCD 2 which can be seen from the photographer 51 while the image reversed in right and left directions is displayed on the sub LCD 5 which can be seen from the to-be-taken subject 52. Therefore, the photographer 51 can see the photographed picture of the to-be-taken subject 52 and the to-be-taken subject 52 can see the image reversed in right and left directions.

In a step S23, the photographer 51 depresses (operates) the shutter key 42 of the portable terminal 1 or the shutter 3 provided on the side surface of the portable terminal 1. In response to this depression, the literal notation "Displaying" or the still photo is displayed on the sub LCD 5 and the still photo is displayed on the main LCD 2.

According to S23 etc., if the photographer 51 depresses the shutter key 42 or the shutter 3 while directing the lens consisting of the camera 6 to the to-be-taken subject 52, the still image of the to-be-taken subject 52 is displayed on the main LCD 2 which can be seen from the photographer 51, and the literal notation "Displaying", or the image reversed in right and left directions is displayed on the sub LCD 5 which can be seen from the to-be-taken subject 52, the photographer 51 can see the still photo, and simultaneously, the to-be-taken subject 52 can see the literal notation to indicate shooting complete or the still image reversed right and left directions.

In a step S24, the photographer 51 sees the photographed still image displayed on the main LCD 2 and determines whether or not the image is to be saved. If Yes, the flow goes to a step S25. If No, that is, the photographer decided not to save the photo, the flow goes on to a step S27.

In a step S25, as the photographer decided to save the photo, the shutter key 42 or the shutter 3 is depressed to instruct saving. In response to the instruction, the literal notation "Displaying" is displayed on the sub LCD 5 and the literal notation "Saving Picture" is displayed on the main LCD 2.

In a step S26, the still picture is saved in the memory.

According to the above Yes in S24, S25 or S26, when the photographer 51 sees the still picture displayed on the main LCD 2 and decides to save the picture, the shutter key 42 or the shutter 3 is depressed, the "Displaying" is displayed on the sub LCD 5 and the "Saving Picture" is displayed on the main LCD 2, and the sill picture is saved in an internal memory or the like.

In a step S27, because the photographer decided not to save the photographed still picture, the clear key 47 is depressed to instruct clearing.

In a step S28, in response to the instruction of clearing in the step S27, the still picture in a working memory is cleared.

According to the above No in S24, S27 to S28, when the photographer 51 sees the still picture displayed on the main LCD 2 and decides not to save the picture, the clear key 47 is depressed to clear the still picture.

Figure 6:
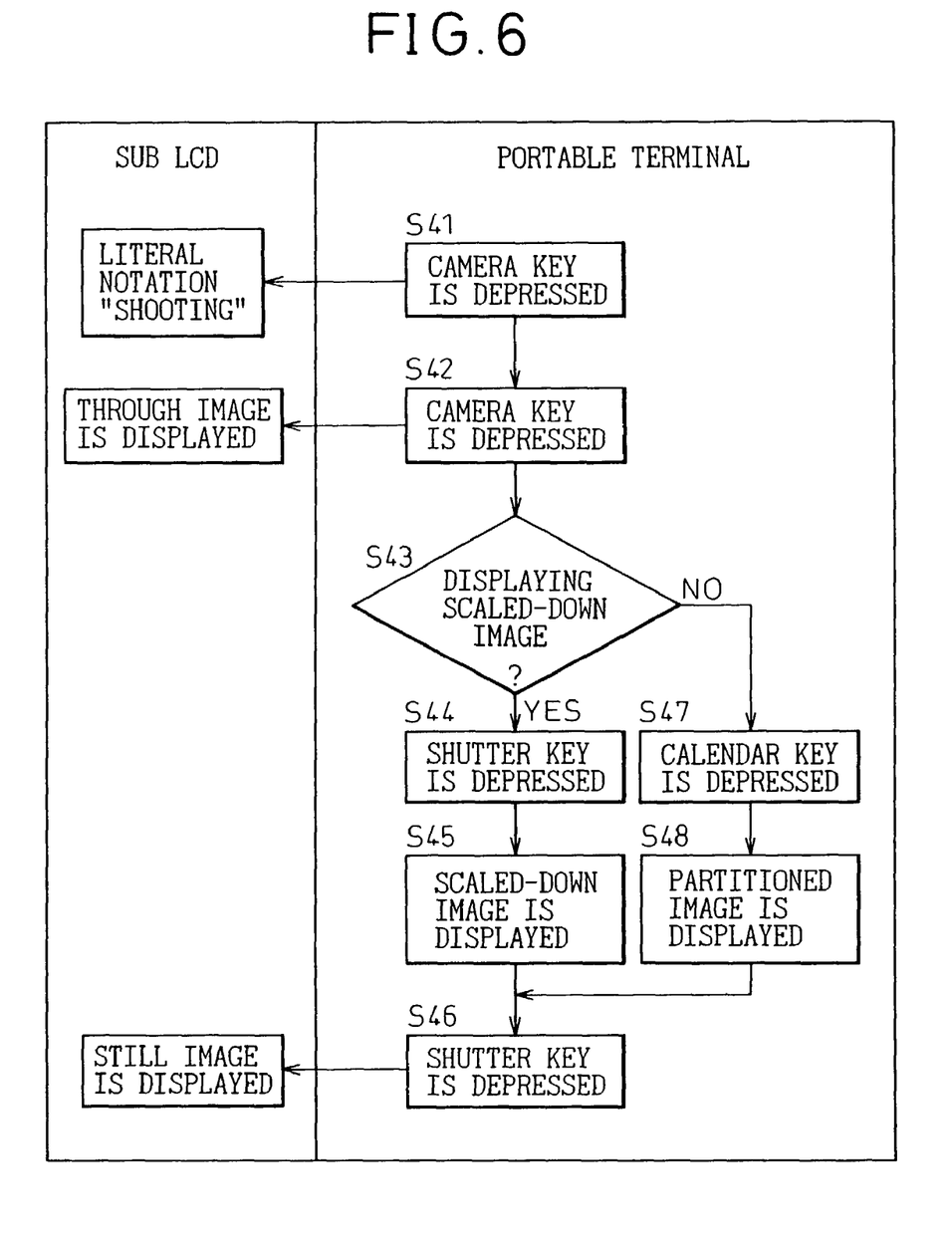
FIG. 6 is a flowchart to explain another operation of a cellular phone of the present invention.

FIG. 6 is a flow chart explaining further operation of the cellular phone. In FIG. 6, because the sub LCD 5 is smaller than the main LCD 2, the whole image cannot be displayed on the sub LCD 5. Therefore, in this drawing, the image displayed on the main LCD 2 is scaled down to be displayed on the sub LCD 5, or partitioned to be displayed one piece of the partitioned image on the sub LCD 5. The display on the main LCD 2 is the same as that shown in the flow chart of FIG. 5 and is omitted.

In FIG. 6, the camera key 41 is depressed in a step S41. In response to this depression, the literal notation "Shooting" is displayed on the sub LCD 5.

In a step S42, the camera key 41 is depressed. In response to this depression, the through image is displayed on the sub LCD 5I.

In a step S43, it is determined whether the image is to be scaled down. If Yes, the image is scaled down and is displayed on the sub LCD 5, and the flow goes on to a step S46. If No, the calendar key is depressed in a step S47, the partitioned image is displayed on the sub LCD in a step S48, and the flow goes on to a step S49.

In a step S46, the shutter key or the shutter 3 is depressed in response to this depression, the scaled-down image or a part of the partitioned image is displayed on the sub LCD 5.

According to the above, the same image as displayed in the main LCD 2 can be arbitrarily switched to be scaled down or to be partitioned and extract a part thereof to be displayed as necessary on the sub LCD 5 which can be seen from the to-be-taken subject 52.

Figure 7:
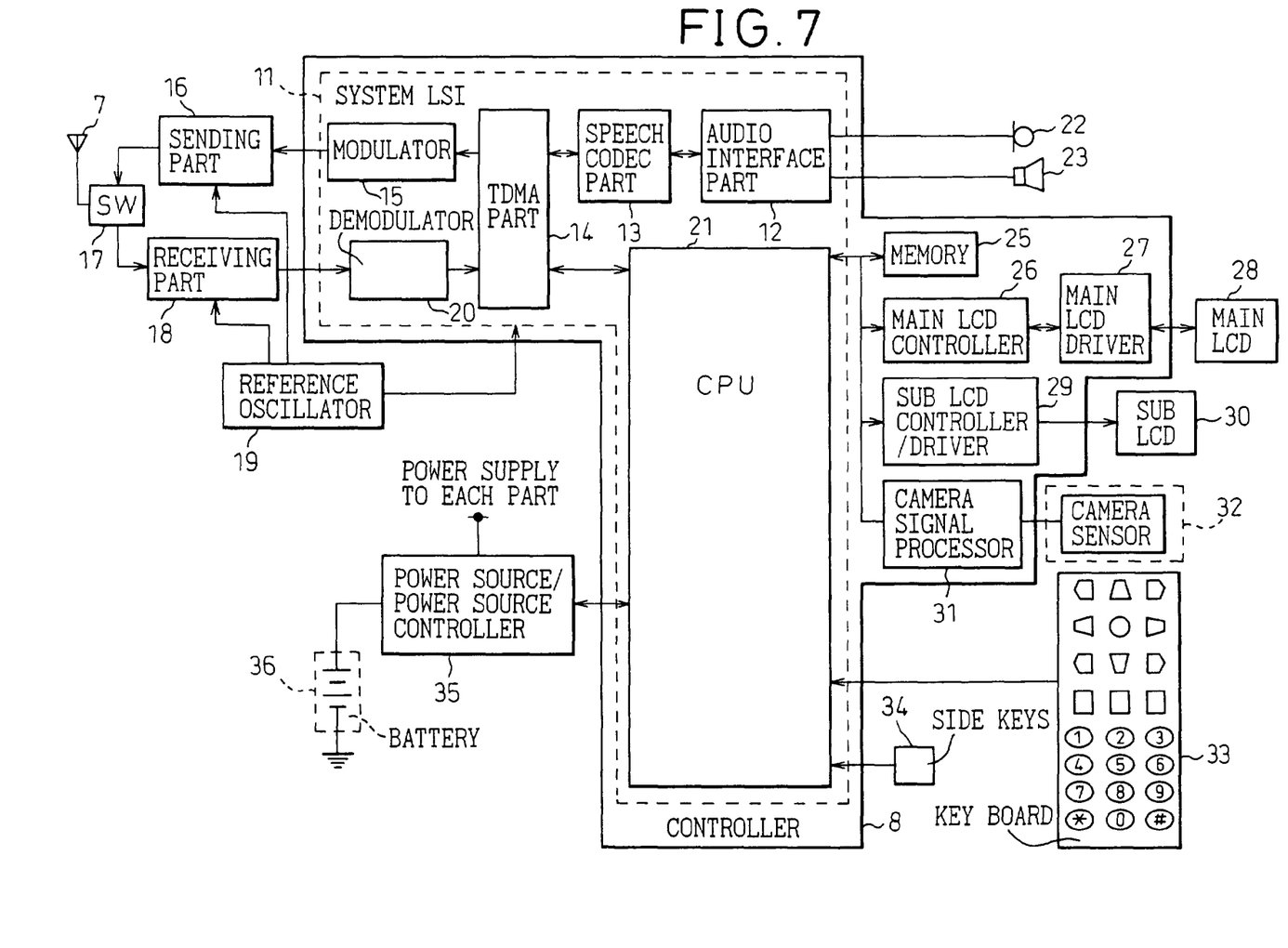
FIG. 7 is a systematic structural view of a cellular phone of the present invention.

FIG. 7 is a is a systematic structural view of a cellular phone of the present invention. In the drawing, a main LCD 28 and a sub LCD 30 correspond to the main LCD 2 and the sub LCD 5 respectively.

In FIG. 7, a system LSI 11 shows a part of LSI circuit portion comprised of numerals 12 to 21 below.

An audio interface part 12 amplifies a signal from a microphone 22, sends a speech signal to a receiver 23 and output a sound.

A voice codec portion 13 encodes speech for easy transmission and decodes encoded speech data to a voice signal.

A TDMA portion 14 converts the speech data, the image data and character data to a predetermined format and decodes the data from the predetermined format.

The modulator 15 modulates a signal from the TDMA portion 14 and transmits it to a sending portion 16.

A demodulator 20 demodulates a signal received by a receiving portion 18.

A CPU 21 performs various process according to a program stored in a ROM which is not shown and control over entirely.

The sending portion 16 generates a signal for transmission from a signal from the modulator 15 based on a standard frequency signal from a reference oscillator 19, and sends it to the antenna 7 via a SW 17 as a radio wave.

The receiving portion 18 receives and amplifies a weak signal received by the antenna 7 via the SW 17, and extracts (receives) it based on a signal from the reference oscillator 19.

The reference oscillator 19 oscillates at a standard frequency signal and is, for example, a crystal oscillator.

A power supply/power supply controller 35 supplies a power source to various parts based on a power source from a battery 36, and perform various controls such as charge of the battery 36 when the power is supplied from an AC adopter which is not shown in the drawing.

The microphone 22 converts the voiced speech to an electric signal.

A receiver 23 converts electric signal to the voiced speech.

A memory 25 is stored various data (the image data, the still image data, a phone number, and the like) in itself.

A main LCD controller 26 controls display of the image and characters on the main LCD 28.

A main LCD driver portion 27 drives to display the image and characters on the main LCD 28.

The main LCD 28 displays the image and characters and corresponds to the main LCD 2 in FIG. 1 as mentioned.

A sub LCD controller/driver portion 29 controls display of the image and characters on the sub LCD 30.

The sub LCD 30 displays the image and characters and corresponds to the sub LCD 5 in FIG. 1 as mentioned.

A camera signal processing part 31 takes the image by controlling a camera sensor.

A camera part 32 is comprised of the camera sensor (CCD, for example), the lens which is not shown, an auto focusing function, and an auto-iris function, and generates an image by taking a picture of the to-be-taken subject 52.

A key board 33 is comprised of operation keys such as the shutter key and the camera key, and a numeric keyboard to input a character and a number, and corresponds to the input device in FIG. 1 as above mentioned.

Side keys 34 are provided on the side surface of the portable device 1 and are the shutter key 3 or the like.

In the above mentioned explanation of the embodiment of the present invention, the camera 5 can be started up, can take a photo, and can save the image by using the camera key 41, the shutter key, and the calendar key 46 which comprise the input device 4 while the portable terminal 1 is unfolded, however, this is an example; the other keys comprising the input device 4 can be used, or, the other keys which do not comprise the input device 4, like any operation keys provided on the side surface of the portable terminal 1 such as the shutter 3, a switch or a slide switch can be provided and used.

As described above, according to the present invention, when an image of a person is taken as a photo with the portable terminal 1, a mirror image or information about the photographing status is displayed on the first display (the sub LCD 5) which can be viewed from the to-be-taken subject while an image (a through image) is displayed on the second display (the main LCD 2) which can be viewed from the photographer, and therefore, the to-be-taken subject can check the image to be taken or the information about the photographing status, and the photographer and the to-be-taken subject can view the image together so that they can easily adjust the feeling and the size properly.

What is claimed is:

1. A portable terminal provided with a camera including a lens and an image pick up device, comprising:
   a first display arranged on a side including the lens;
   a second display arranged on a side opposite to the side including the lens; and
   a display control unit displaying an image of a subject on the second display and literal information on the first display, the literal information indicating a state of the second display, when the lens is directed to the subject.

2. The portable terminal according to claim 1, wherein the display control unit displays a still image of the subject on the second display and the literal information on the first display, the literal information indicating that the still image is displayed on the second display, when a shutter key is operated.

3. The portable terminal according to claim 1, the display control unit displays a still image of the subject on the second display and a scaled-down image or a partitioned image of the still image on the first display, when a shutter key is operated.

4. The portable terminal according to claim 1,
   wherein the display control unit switches between the literal information and a scaled-down image or a partitioned image of the still image on the first display.

* * * * *